United States Patent
Huang et al.

(10) Patent No.: US 9,591,208 B2
(45) Date of Patent: Mar. 7, 2017

(54) IMAGE CAPTURING DEVICE AND AUTO-FOCUS COMPENSATION METHOD THEREOF

(71) Applicant: Acer Incorporated, New Taipei (TW)

(72) Inventors: Shih-Ting Huang, New Taipei (TW); Jian-Wei Lee, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 14/693,879

(22) Filed: Apr. 23, 2015

(65) Prior Publication Data

US 2016/0044234 A1   Feb. 11, 2016

(30) Foreign Application Priority Data

Aug. 11, 2014   (TW) .............................. 103127476 A

(51) Int. Cl.
*H04N 5/232*   (2006.01)

(52) U.S. Cl.
CPC ..... *H04N 5/23216* (2013.01); *H04N 5/23212* (2013.01); *H04N 5/23293* (2013.01)

(58) Field of Classification Search
CPC ........... H04N 5/23216; H04N 5/23212; H04N 5/23293
See application file for complete search history.

(56) References Cited

U.S. PATENT DOCUMENTS

| | | | | |
|---|---|---|---|---|
| 2010/0156941 A1* | 6/2010 | Seung | ................ | G06F 3/04847 345/660 |
| 2010/0317410 A1* | 12/2010 | Song | ................... | G06F 3/04886 455/566 |
| 2012/0105579 A1* | 5/2012 | Jeon | ..................... | H04N 5/2258 348/38 |

(Continued)

FOREIGN PATENT DOCUMENTS

TW   201205472   2/2012

OTHER PUBLICATIONS

Dr. J, "Simple operation to lock iPhone 4S camera exposure and focus values for you to change the composition freely," Apr. 1, 2012, with English translation thereof, available at: http://web.archive.org/web/20120729203702/http://www.techbang.com/posts/8604-how-to-master-iphone-4s-photo-exposure.

(Continued)

*Primary Examiner* — James Hannett
(74) *Attorney, Agent, or Firm* — Jianq Chyun IP Office

(57) ABSTRACT

An auto-focus compensation method, adapted to an image capturing device having a touch screen, includes the following steps. First, a first touch operation performed on a first object displayed on the touch screen is detected. Next, an auto-focusing procedure is performed so as to obtain a focused image. A staying time of the first touch operation on the first object is accumulated and determined whether it exceeds a time threshold. When the staying time exceeds the time threshold, an adjustment interface is displayed on the (Continued)

touch screen, and a second touch operation performed on the adjustment interface is detected. The focused image is adjusted according to the second touch operation, and a new focused image is thus obtained and captured. An image capturing device is also provided in the invention to implement the aforementioned auto-focus compensation method.

7 Claims, 10 Drawing Sheets

(56) References Cited

U.S. PATENT DOCUMENTS

| | | | | |
|---|---|---|---|---|
| 2015/0103002 | A1* | 4/2015 | Yoon | H04N 5/23293 345/157 |
| 2015/0135108 | A1* | 5/2015 | Pope | G06K 9/00006 715/767 |
| 2015/0195452 | A1* | 7/2015 | Saito | G06F 3/0488 348/333.02 |
| 2015/0350130 | A1* | 12/2015 | Yang | H04L 51/046 715/752 |
| 2016/0011718 | A1* | 1/2016 | Krulce | G06F 3/0416 345/173 |

OTHER PUBLICATIONS

Gary, "[Tips for iPhone] How to enable the digital zoom function of the built-in camera?" Nov. 29, 2010, with English translation thereof, available at: http://web.archive.org/web/20140419192516/http://www.macuknow.com/node/7637.

Jason, "You can also taste the flavor of mango: HTC Radar field test," Oct. 30, 2011, with English translation thereof, available at: http://web.archive.org/web/20140730005846/http://www.eprice.com.tw/mobile/talk/4542/4693691/1/rv/htc-radar-review.

Bear Cookie, "Five new camera functions of iOS8 that WWDC did not mention!" Jun. 4, 2014, with English translation thereof, available at: http://web.archive.org/web/20140807025906/http://www.newmobilelife.com/2014/06/04/ios8-camera-new-function.

Axiang, "[Mobile] Special feature + analysis of camera spec: comparison of camera functions among three flagships S4, New One, and Xperia ZL!" Jun. 13, 2013, with English translation thereof, available at: http://web.archive.org/web/20140329035814/http://axiang.cc/archives/6435.

"Office Action of Taiwan Counterpart Application," issued on Jan. 12, 2016, p. 1-p. 10, in which the listed references were cited.

* cited by examiner

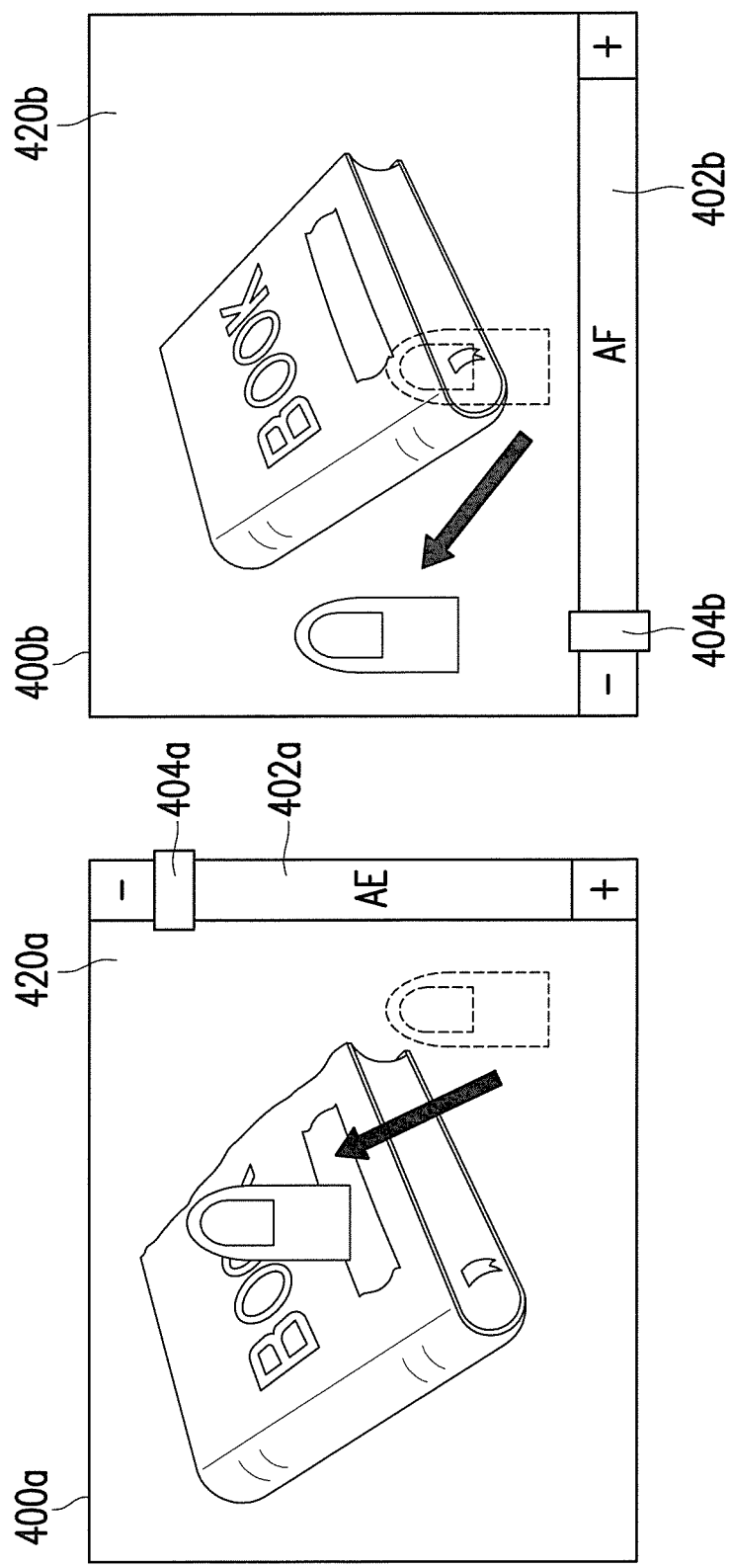

IMAGE CAPTURING DEVICE AND AUTO-FOCUS COMPENSATION METHOD THEREOF

CROSS-REFERENCE TO RELATED APPLICATION

This application claims the priority benefit of Taiwan application serial no. 103127476, filed on Aug. 11, 2014. The entirety of the above-mentioned patent application is hereby incorporated by reference herein and made a part of this specification.

BACKGROUND OF THE INVENTION

1. Field of the Invention

The present invention generally relates to an image capturing device, in particular, to an image capturing device and an auto-focus compensation method thereof.

2. Description of Related Art

With development in technology, various smart image capturing devices, such as tablet computers, personal digital assistants and smart phones, have become indispensable tools for people nowadays. Camera lenses equipped in high-end smart image capturing devices provide same or better specifications than those of traditional consumer cameras, and some even provide near-equivalent pixel qualities to those of digital single lens reflex cameras.

In general, while an image capturing device is performing an auto-focus procedure by moving its lens, it may concurrently calculate the clarity of the image to obtain an optimal focused image. However, such procedure may be failed under a dark scene, and a blurred image may be captured. The main reason is that the auto-focus procedure may not be able to search out an optimal focusing position of the lens to generate an image with maximum clarity under all scenes and circumstances.

SUMMARY OF THE INVENTION

Accordingly, the invention is directed to an image capturing device and an auto-focus compensation method thereof, which is able to compensate a focused image generated from an auto-focus procedure so as to reduce the chances of capturing blurred or out-of-focus images.

The invention is directed to an auto-focus compensation method, adapted to an image capturing device having a touch screen. The method includes the following steps. First, a first touch operation performed on a first object displayed on the touch screen is detected. Next, an auto-focusing procedure is performed to obtain a focused image. A staying time of the first touch operation on the first object is accumulated and determined whether it exceeds a time threshold. When the staying time exceeds the time threshold, an adjustment interface is displayed on the touch screen, and a second touch operation performed on the adjustment interface is detected. The focused image is adjusted according to the second touch operation, and a new focused image is thereby obtained and captured.

The invention is also directed to an image capturing device including a touch screen, a storage unit, and one or more processing unit, where the processing unit is coupled to the touch screen and the storage unit. The storage unit is configured to record a plurality of modules. The processing unit is configured to access and execute the modules recorded in the storage unit. The module includes a displaying module, a detecting module, an image capturing muddle, a time determining module, and an image adjusting module. The displaying module displays a first object on the touch screen. The detecting module detects a first touch operation on the first object. The image capturing module performs an auto-focus procedure to obtain a focused image. The time determining module accumulates a staying time of the first touch operating on the first object and determines whether the staying time exceeds a time threshold. When the time determining module determines that the staying time exceeds the time threshold, the displaying module displays an adjustment interface on the touch screen, and the detecting module detects a second touch operation on the adjustment interface. The image adjusting module adjusts the focused image according to the second touch operation on the adjustment interface and thereby obtains a new focused image, and the image capturing module captures the new focused image.

The invention is directed to another auto-focus compensation method, adapted to an image capturing device having a touch screen. The method includes the following steps. First, a first touch operation performed on a first object displayed on the touch screen is detected. Next, an auto-focusing procedure is performed to obtain a focused image, and the focused image is determined whether it satisfies a clarity condition. When the focused image satisfies the clarity condition, the focused image is captured. When the focused image does not satisfy the clarity condition, an adjustment interface is displayed on the touch screen. A second touch operation on the adjustment interface is detected to accordingly adjust the focused image, and a new focused image is thereby obtained and captured.

In summary, in the image capturing device and the auto-focus compensation method thereof, after a focused image is obtained from an auto-focus procedure, an auxiliary control mechanism of an adjustment interface is employed for allowing the user to adjust the focused image for compensating the result obtained from the auto-focus procedure so as to reduce the chances of capturing blurred or out-of-focus images.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4(a) and the FIG. 4(b) illustrate schematic diagrams for adjusting focused images according to an embodiment of the invention.

DESCRIPTION OF THE EMBODIMENTS

Figure 1:
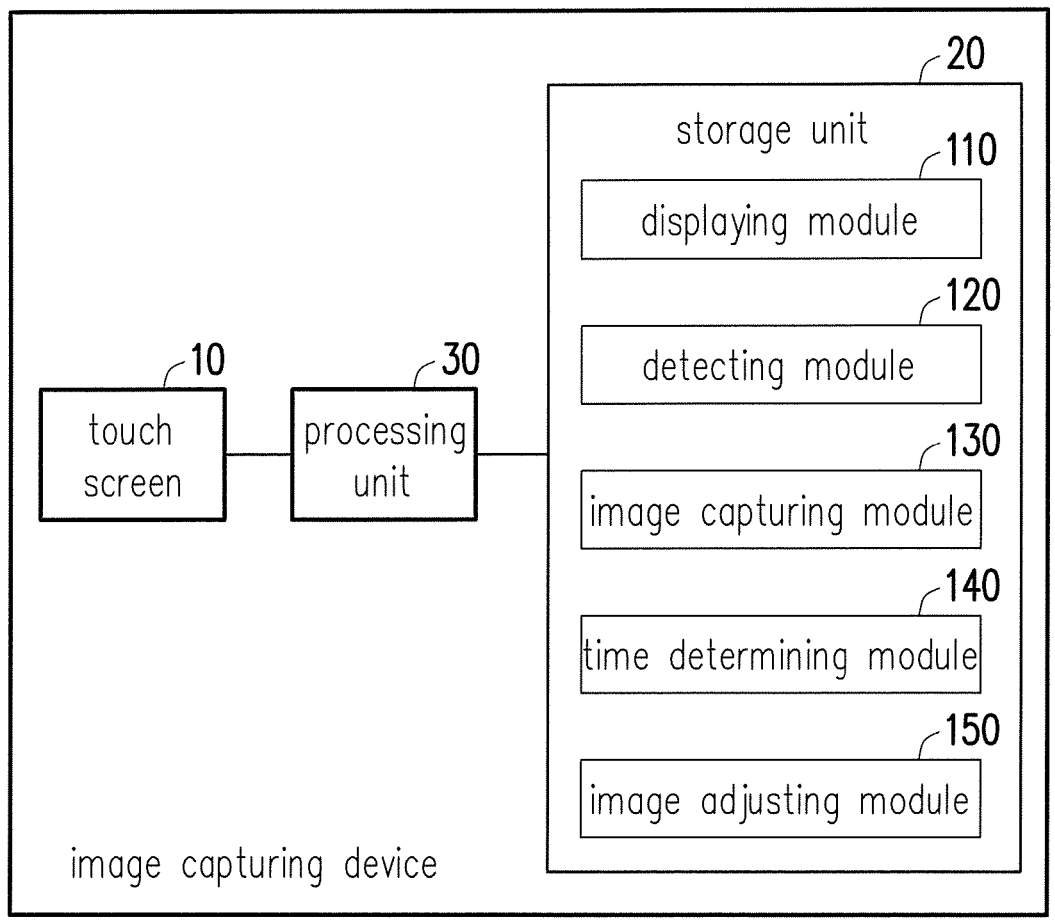
FIG. 1 illustrates a block diagram of an image capturing device according to an embodiment of the invention.

Reference will now be made in detail to the present embodiments of the invention, examples of which are illustrated in the accompanying drawings. Wherever possible, the same reference numbers are used in the drawings and the description to refer to the same or like parts. In addition, the specifications and the like shown in the drawing figures are intended to be illustrative, and not restrictive. Therefore, specific structural and functional detail disclosed herein are not to be interpreted as limiting, but merely as a representative basis for teaching one skilled in the art to variously employ the present invention.

FIG. 1 illustrates a block diagram of an image capturing device according to an embodiment of the invention. It should, however, be noted that this is merely an illustrative example and the invention is not limited in this regard. All components of the image capturing device and their configurations are first introduced in FIG. 1. The detailed functionalities of the components are disclosed along with FIG. 2.

Referring to FIG. 1, an image capturing device 100 includes a touch screen 10, a storage unit 20, and one or a plurality of processing units 30. In the present embodiment, the image capturing device 100 is, for example, a digital camera, a digital camcorder, a digital single lens reflex camera or other devices provided with an image capturing feature such as a smart phone, a tablet computer, a personal digital assistant, a head mount display, and so on. The invention is not limited herein.

The touch screen 10 may be a display integrated with touch detection components, which provides a display feature as well as an input feature. Such display may be a liquid crystal display (LCD), a light-emitting diode (LED) display, a field emission display (FED) or other types of displays. The invention is not limited herein. The touch detection components are arranged in rows and columns in the display for detecting a touch input of a finger, a palm, or other objects on the touch screen 10. The touch detection components may be, for example, capacitive touch detection components, surface acoustic wave touch detection components, electromagnetic touch detection components, or near-field imaging touch detection components, and yet the invention is not limited herein.

The storage unit 20 may be one or a combination of a stationary or mobile random access memory (RAM), a read-only memory (ROM), a flash memory, a hard drive or other similar devices. The storage unit 20 is configured to record a plurality of modules executable by the processing unit 30. The modules include a displaying module 110, a detecting module 120, an image capturing module 130, a time determining module 140, and an image adjusting module 150, where the modules may be loaded into the processing unit 30 for performing the proposed auto-focus compensation method.

The processing unit 30 may be, for example, a central processing unit (CPU) or other programmable devices for general purpose or special purpose such as a microprocessor and a digital signal processor (DSP), a programmable controller, an application specific integrated circuit (ASIC), a programmable logic device (PLD), other similar devices or a combination of above-mentioned devices. The processing unit 30 is coupled to the touch screen 10 and the storage unit 20, and capable of accessing and executing the modules recorded in the storage unit 20 for performing the auto-focus compensation method so as to enhance the quality of an image captured by the image capturing device 100.

Figure 2:
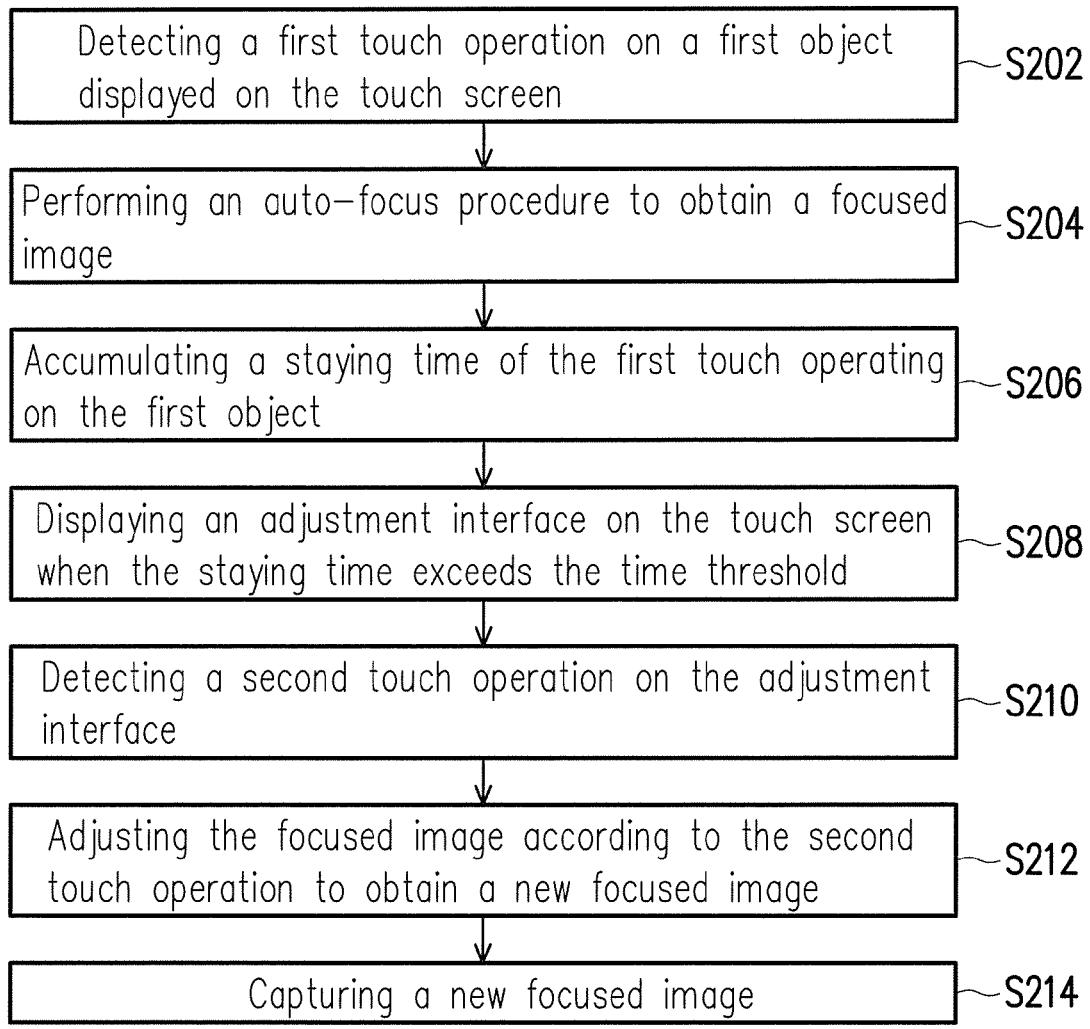
FIG. 2 illustrates a flowchart of an auto-focus compensation method of an image capturing device according to an embodiment of the invention.

FIG. 2 illustrates a flowchart of an auto-focus compensation method of an image capturing device according to an embodiment of the invention, and the auto-focus compensation method of the image capturing device in FIG. 2 may be implemented by the components of the image capturing device 100 in FIG. 1.

Referring to both FIG. 1 and FIG. 2, the detecting module 120 detects a first touch operation on a first object displayed on the touch screen (Step S202). To be specific, the displaying module 110 may first display the first object on the touch screen 10, where the first object is a feature icon corresponding to image capture. Next, detecting module 120 may then detect whether the feature icon corresponding to image capture is selected. In the present embodiment, the first touch operation may be, for example, a long-press gesture performed on the feature icon corresponding to image capture by the user.

Next, the image capturing module 130 performs an auto-focus procedure to obtain a focused image (Step S204). To be specific, when the detecting module 120 detects the aforesaid first touch operation, the image capturing module 130 may control a lens (not shown) of the image capturing device 100 to move to a focusing position using an auto-focus technique such as a hill-climbing method to obtain the focused image with maximum clarity.

Next, the time determining module 140 accumulates a staying time of the first touch operating on the first object and determines whether the staying time exceeds a time threshold (Step S206). In other words, the time determining module 140 may accumulate the time that the first touch operation stays on the touch screen 10 and may accordingly determine whether the first touch operation is a long-press or a short-press gesture on the touch screen 10.

When the time determining module 140 determines that the staying time exceeds the time threshold, the displaying module 110 displays an adjustment interface on the touch screen 10 (Step S208). The detecting module 120 detects a second touch operation on the adjustment interface (Step S210), and the image adjusting module 150 further adjusts the focused image according to the second touch operation to obtain a new focused image (Step S212). To be specific, when the staying time exceeds the time threshold, it represents that the first touch operation on the touch screen 10 is a long-press gesture. Meanwhile, the displaying module 110 may display the adjustment interface on the touch screen 10 to provide an adjustment feature for the user to adjust the aforesaid focused image obtained from the auto-focus procedure. The detecting module 120 may also detect the second touch operation performed on the adjustment interface. In the present embodiment, the second touch operation may be a sliding gesture performed by the user for adjusting the focused image. Next, the image adjusting module 150 may adjust parameter settings of the image capturing device 100 to adjust the focused image for obtaining the new focused image. In other words, during the adjustment, the image adjusting module 150 may dynamically adjust the parameter settings of the image capturing device 100 and determine an optimal focusing position according to the second touch operation. More embodiments for adjusting the focused image by the image adjusting module 150 will be illustrated hereinafter.

In an embodiment, after the displaying module 110 displays the adjustment interface on the touch screen 10, the detecting module 120 may detect a moving direction and a moving amount of the second touch operation performed on the adjustment interface. The image adjusting module 150 may accordingly adjust one of parameters associated with the image capturing device 100 (referred to as a "first parameter") and thereby adjust the focused image.

For example, FIG. 3(a)-FIG. 3(d) illustrates a schematic diagram for adjusting a focused image according to an embodiment of the invention. The first parameter herein is an auto-focus value (AF value).

First, referring to FIG. 3(a), when the time determining module 140 determines that the staying time exceeds the time threshold, the touch screen 10 may display an adjustment interface 300 including a scrollbar 302 and a focused image 310a. A moving element 304 of the scrollbar 302 may determine the AF value and may be moved according to the second touch operation. It should be noted that, the second touch operation is not limited to be performed on the moving element 304. The user may perform the second touch operation at any position on the adjustment interface 300, and the detecting module 120 may adjust the AF value according to the moving amount and the moving direction of the second touch operation. In the present embodiment, the detecting module 120 may adjust the AF value according to a horizontal moving amount and a horizontal moving direction of the second touch operation. In another embodiment, the detecting module 120 may adjust the AF value according to a vertical moving amount and a vertical moving direction of the second touch operation.

As an example, in FIG. 3(b), while the user is adjusting the focused image, if a horizontal moving direction of a sliding gesture moves towards the left of the scrollbar 302 and a moving amount thereof is large, the image adjusting module 150 may determine that the user wishes to greatly reduce the AF value and thus obtain a new focused image 320b with a low AF value. Moreover, the first parameter is not necessarily adjusted according to an actual moving path of the sliding gesture. For example, moving paths of sliding gestures illustrated in FIG. 3(c) and FIG. 3(d) are different. However, since a horizontal moving amount and a horizontal moving directions corresponding to each of the sliding gestures are the same, adjusted amounts of AF values in FIG. 3(c) and FIG. 3(d) are the same as that in FIG. 3(b). Hence, a new focused image 320c and a new focused image 320d respectively displayed on the adjustment interface 300 in FIG. 3(c) and FIG. 3(d) are the same as the new focused image 320b in FIG. 3(b).

In another embodiment, the image adjusting module 150 may adjust two parameter settings of the image capturing device 100 concurrently according to the second touch operation. To be specific, after the detecting module 120 detects the moving direction and the moving amount of the second touch operation, when the detecting module 120 determines that the moving direction corresponds to a horizontal direction, the image adjusting module 150 may adjust one of the parameters associated with the image capturing device 100 (referred to as a "second parameter") according to the moving amount. When the detecting module 120 determines that the moving direction corresponds to a vertical direction, the image adjusting module 150 may adjust another one of the parameters associated with the image capturing device 100 (referred to as a "third parameter") according to the moving amount. The detecting module 120 may determine the vertical moving direction and the vertical moving direction according to an angle between the moving direction of the second touch operation and an X-axis. For example, when the angle between the moving direction of the second touch operation and the X-axis is less than 45 degrees, the detecting module 120 may determine that the moving direction is the horizontal moving direction. When the angle between the moving direction of the second touch operation and the X-axis is greater than 45 degrees, the detecting module 120 may determine that the moving direction is the vertical moving direction. Next, the image adjusting module 150 may adjust the focused image according to the adjusted second parameter and the adjusted third parameter and thereby obtain the new focused image.

For example, FIG. 4(a) and the FIG. 4(b) illustrate schematic diagrams for adjusting focused images according to an embodiment of the invention. The two parameters of the image capturing device 100 adjusted in the present embodiment are an auto-focus value (AF value) and an auto-exposure value (AE value), where the AF value is the aforesaid second parameter, and the AE value is the aforesaid third parameter.

First, referring to FIG. 4(a), assume that the angle between a sliding gesture of the user and the X-axis is 60 degrees. The detecting module 120 may determine that a moving direction of the sliding gesture is in the vertical direction. A moving element 404a of a scrollbar 402a on an adjustment interface 400a may be vertically moved to the top of the scrollbar 402a according to a moving amount of the sliding gesture in the vertical direction. The image adjusting module 150 may adjust the AE value accordingly and thereby obtain a new focused image 420a with a low AE value.

Next, referring to FIG. 4(b), assume that the angle between another sliding gesture of the user and the X-axis is 30 degrees. The detecting module 120 may determine that a moving direction of the sliding gesture is in the horizontal direction. A moving element 404b of a scrollbar 402b on an adjustment interface 400b may be horizontally moved to the left of the scrollbar 402b according to a moving amount of the sliding gesture in the horizontal direction. The image adjusting module 150 may adjust the AF value accordingly and obtain a new focused image 420b with a low AF value.

Figure 3:
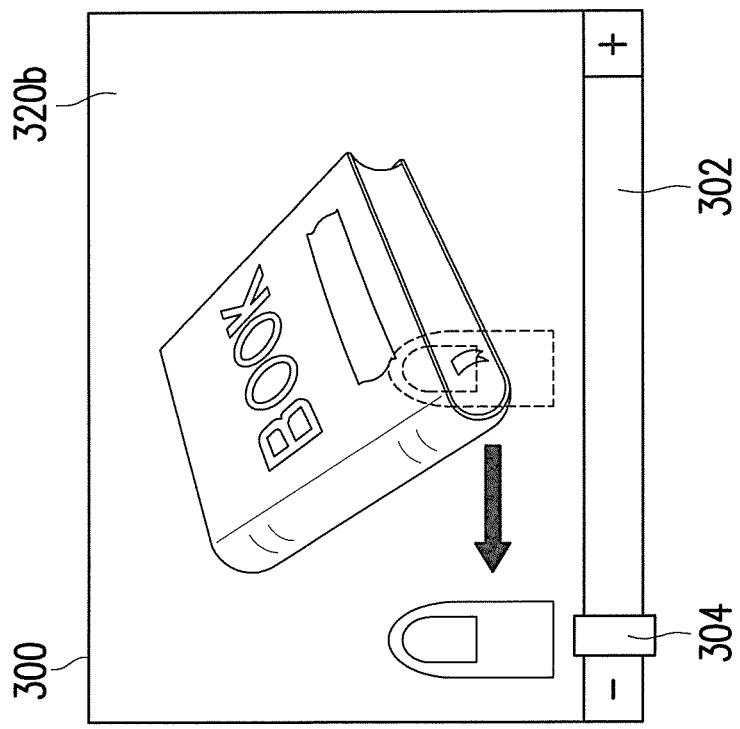
FIG. 3(a)-FIG. 3(d) illustrates schematic diagrams for adjusting focused images according to an embodiment of the invention.
Figure 3:
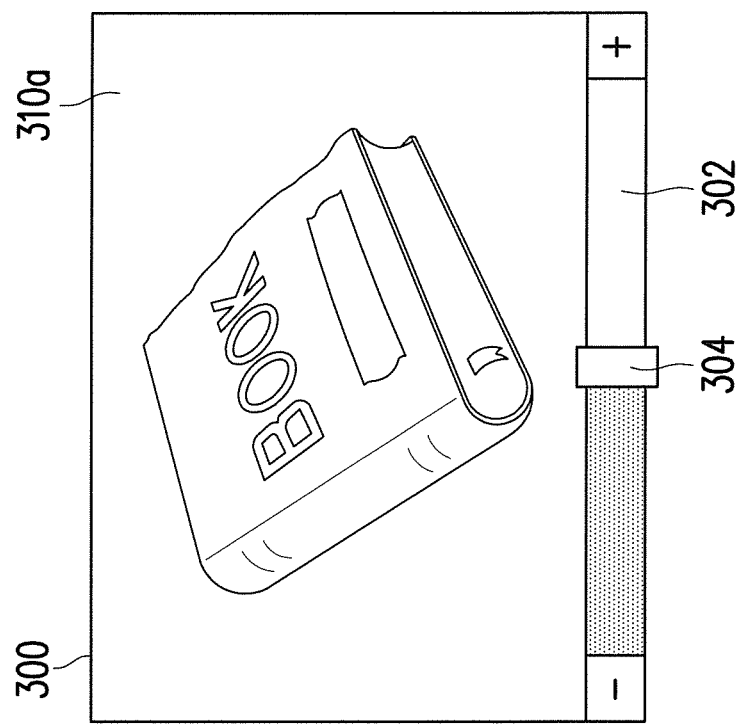
Figure 3D:
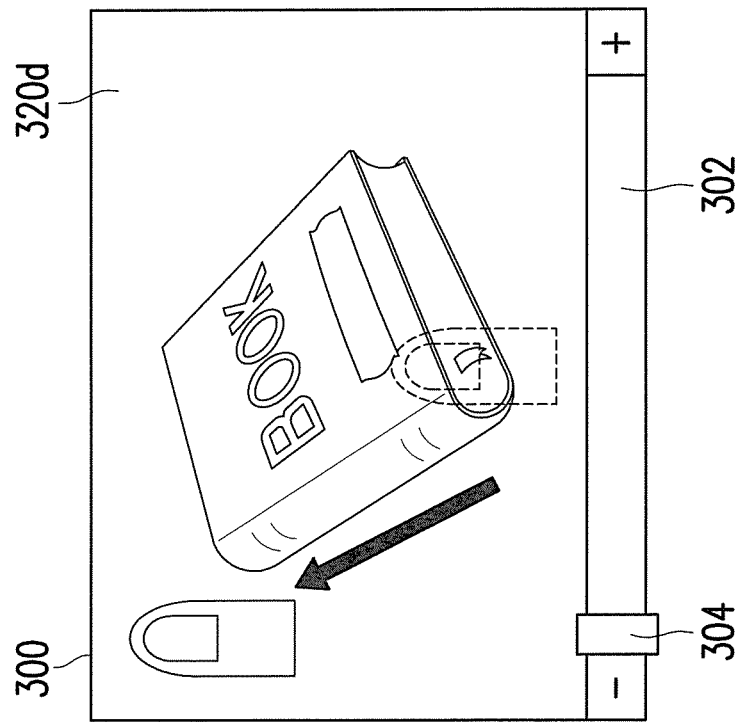
Figure 3C:
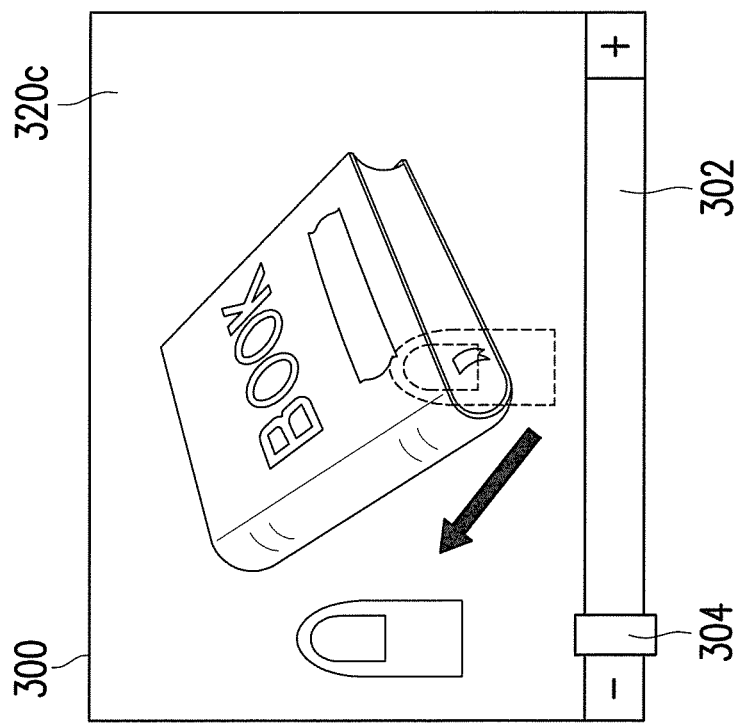

In the embodiments in FIG. 3 and FIG. 4, at most two parameter settings are allowed to be adjusted by the user. However, the image capturing device 100 may include a plurality of parameter settings such as brightness, contrast, saturation, sharpness, and so forth. In another embodiment, when the display module 110 displays the adjustment interface on the touch screen 10, it may concurrently display a plurality of parameters associated with the image capturing device 100 on the adjustment interface. Next, the detecting module 110 may detect a third touch operation for selecting one of the parameters. In the present embodiment, the third touch operation may be a sliding gesture, and the parameter selected by the third touch operation is referred to as a "selected parameter".

Figure 5:
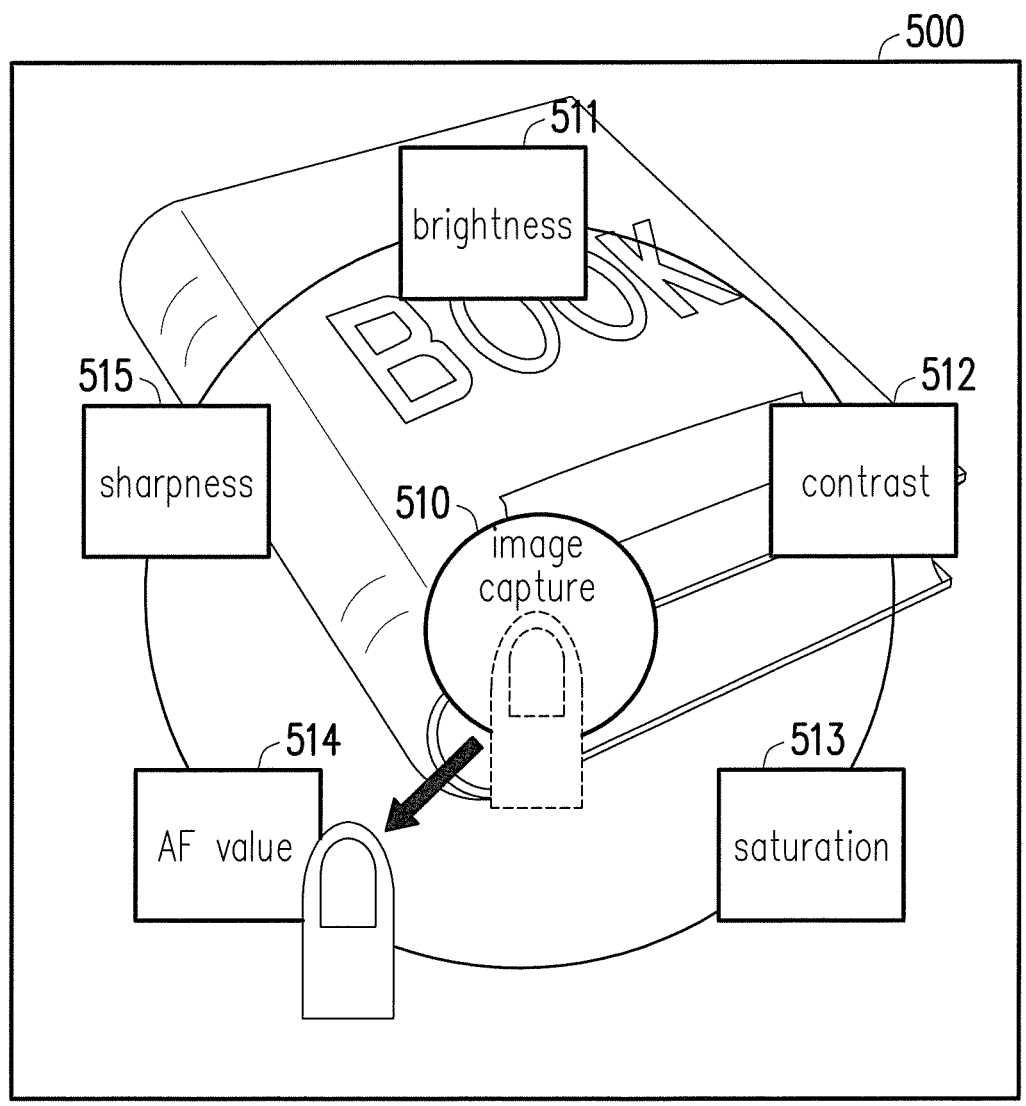
FIG. 5 illustrates a schematic diagram for operating an adjustment interface according to an embodiment of the invention.

For example, FIG. 5 illustrates a schematic diagram for operating an adjustment interface according to an embodiment of the invention. In the present embodiment, the display module 110 displays five parameter icons corresponding to brightness 511, contrast 512, saturation 513, AF value 514, and sharpness 515 on an adjustment interface 500. When the user wishes to adjust the AF value, he/she may slide the finger from a feature icon corresponding to image capture 510 to the parameter icon of the AF value 514 and then release the finger therefrom. The detecting module 120 may then determine that the use wishes to adjust the AF value. Next, the displaying module 110 may display an interface as illustrated in FIG. 3(a) for the user to adjust the AF value and obtain the new focused image accordingly. Detailed description may refer to the aforementioned related paragraphs and will not be repeated hereinafter.

In an embodiment, when the image adjusting module 150 adjusts the focused image and generates the new focused image, the displaying module 110 may display the focused image and the new focused image concurrently on the adjustment interface so that the user may compare the difference before and after the adjustment and further confirm the result of the adjusted parameter(s) and the adjusted focused image.

Figure 6B:
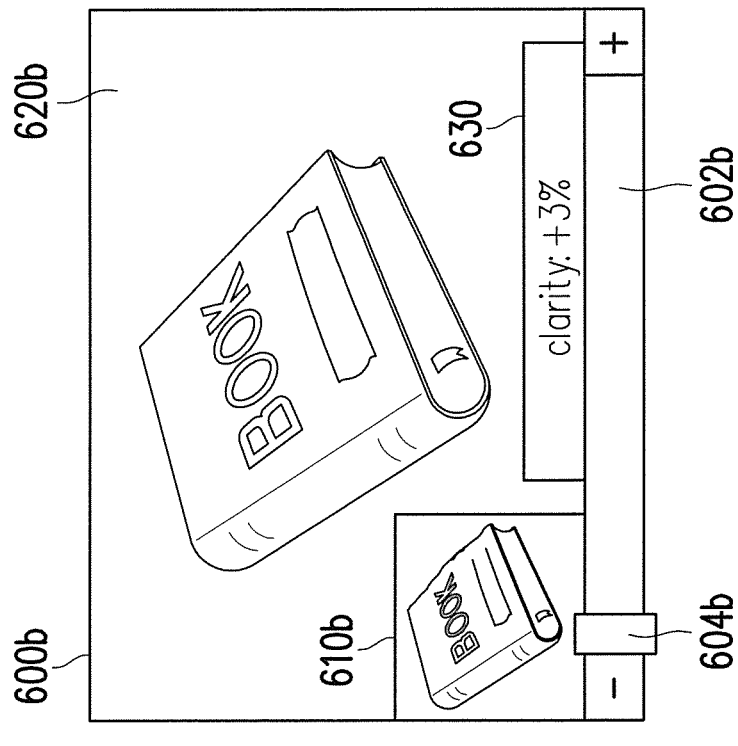
FIG. 6(a) and FIG. 6(b) illustrate two focused images according to an embodiment of the invention.
Figure 6A:
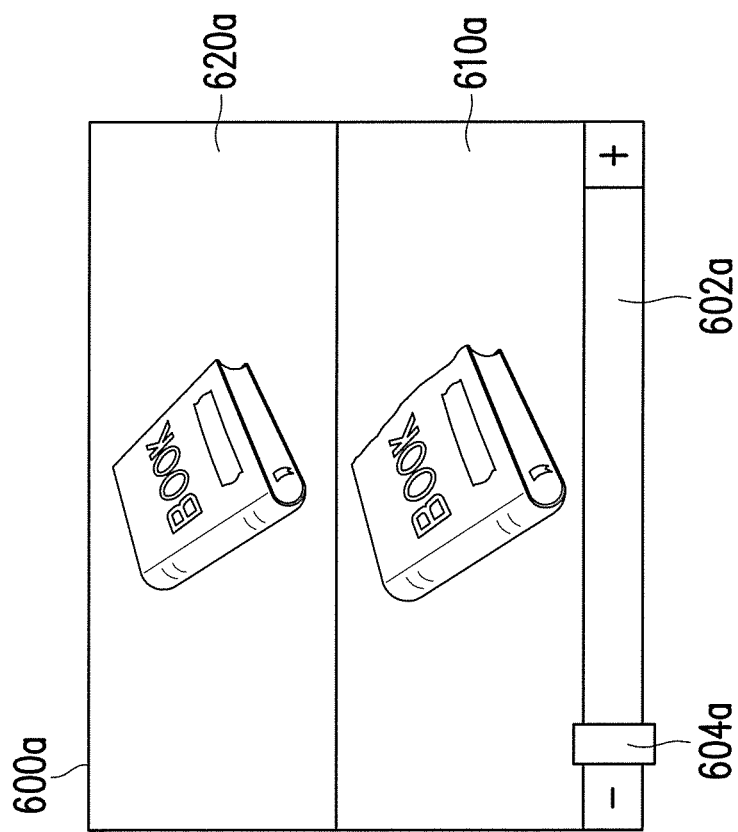

For example, FIG. 6(a) and FIG. 6(b) illustrate two focused images according to an embodiment of the invention. In the present embodiment, the parameter adjusted by the image adjusting module 150 is the AF value.

First, referring to FIG. 6(a), the displaying module 110 may concurrently display a focused image 610a and a new focused image 620a, vertically side by side, on an adjustment interface 600a. Moreover, the adjustment interface 600a includes a scrollbar 602a and a moving element 604a to display an adjustment level of the parameter to be adjusted. In another embodiment, the displaying module 110 may also concurrently display the focused image and the new focused image, horizontally side by side, on the adjustment interface.

However, such two displaying arrangements may change the scale of the focused image and adversely affect the viewing angle. Hence, in the embodiment of FIG. 6(b), the displaying module 110 may display a smaller and a larger image (i.e. a focused image 610b and a new focused image 620b) along with auxiliary wording 630 on an adjustment interface 600b. Moreover, the adjustment interface 600b includes a scrollbar 602b and a moving element 604b. That is, in the present embodiment, the displaying module 110 may display the new focused image 620b in an original scale and display the focused image 610b in a smaller scale, for example, at the bottom left corner. Since the two images are not with the same size and may thus affect the user to determine the result of adjusting the AF value, the auxiliary wording 630 may provide the clarity of the new focused image 620b. The user may determine the adjustment level of the AF value according to such information.

In the present embodiment, the image adjusting module 150 may obtain the clarity of the new focused image 620b by applying an edge detection algorithm such as Gaussian Edge Detection, Sobel Edge Detection, Laplacian Edge Detection, and so forth. As the new focused image 620b becomes clear, the number of detected edge points increases. On the other hand, as the new focused image 620b becomes blur, the number of detected edge points decreases. In FIG. 6(b), the number of edge points detected from the focused image 610b is 100, and the number of edge points detected from the new focused image 620b is 103. Hence, the displaying module 110 may display "clarity=+3%" as the auxiliary wording 630, which means that the result after the adjustment is clearer than the original focused image 610b.

Revisiting FIG. 2, after the image adjusting module 150 obtains the new focused image, the image capturing module 130 would capture the new focused image (Step S214). In the present embodiment, after the image adjusting module 150 obtains the new focused image, the detecting module 120 may detect whether the feature icon corresponding to image capture is touched by the user. If so, the image capturing module 130 may capture and save the new focused image in the storage unit 20. If not, it represents that the user may wish to continue adjusting the new focused image, and the detecting module 120 may continue detecting the second touch operation on the adjustment interface to re-generate another new focused image.

In the embodiment of FIG. 2, the first touch operation of the user is used for determining whether to adjust the focused image originally generated from the auto-focus procedure performed by the image capturing device 100. When the staying time of the first touch operation on the touch screen 10 exceeds the time threshold, the displaying unit 110 may display the adjustment interface for the user to adjust the focused image. In another embodiment, when the detecting module 120 detects that the first touch operation leaves the touch screen and the time determining module 140 determines that the staying time does not exceed the time threshold, the image capturing module 130 may capture the focused image originally generated from the auto-focus procedure. Such process may be illustrated by a flowchart of an auto-focus compensation method of an image capturing device in FIG. 7 according to an embodiment of the invention.

Figure 7:
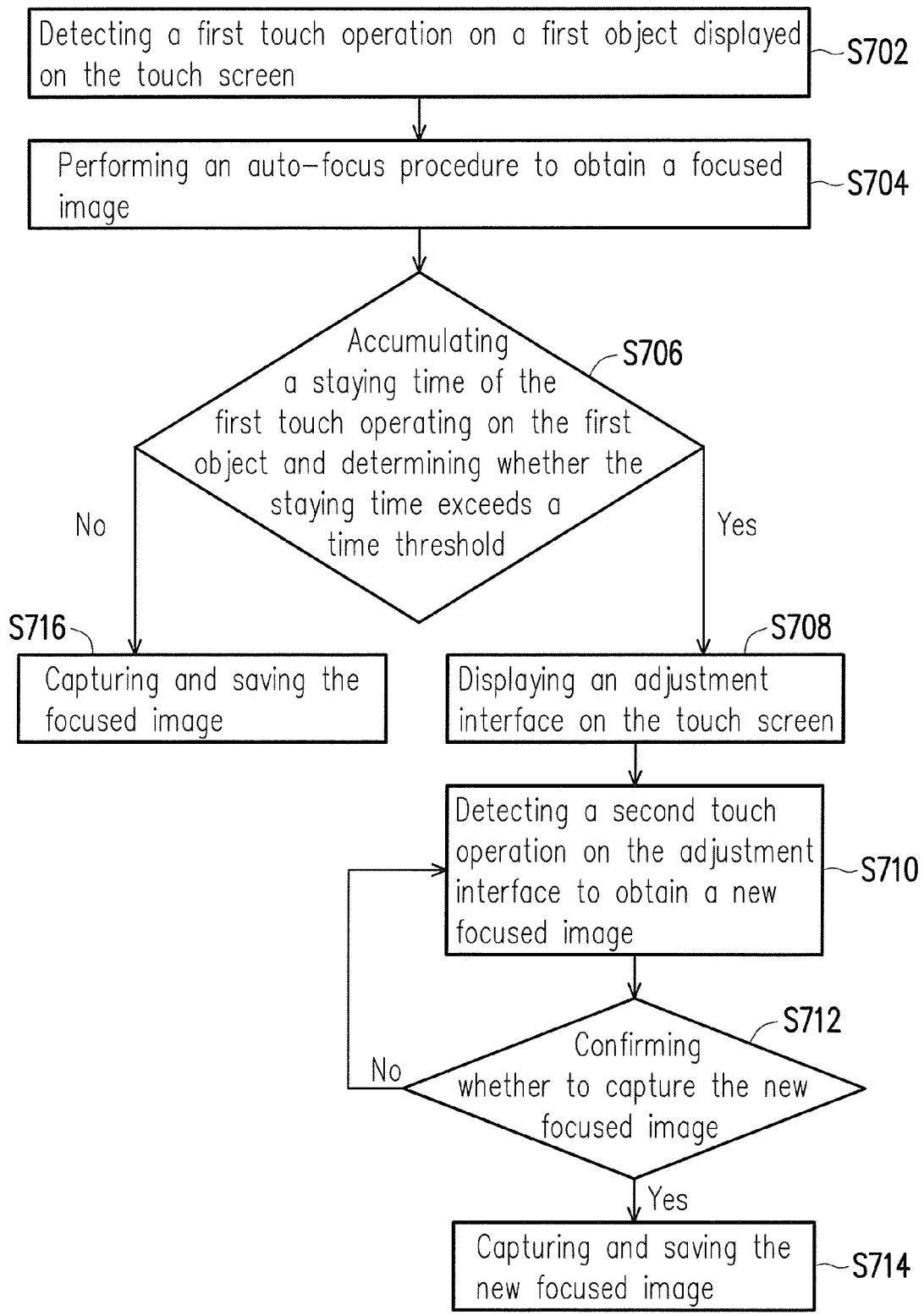
FIG. 7 illustrates a flowchart of an auto-focus compensation method of an image capturing device according to an embodiment of the invention.

Referring to FIG. 7, the detecting module 120 first detects a first touch operation on a first object displayed on the touch screen 10 (Step S702), and the image capturing device 130 performs an auto-focus procedure to obtain a focused image (Step S704). Next, the time determining module 140 accumulates a staying time of the first touch operating on the first object and determines whether the staying time exceeds a time threshold (Step S706). When the time determining module 140 determines that the staying time exceeds the time threshold, the displaying module 110 displays an adjustment interface on the touch screen 10 (Step S708), and the image adjusting module 150 detects a second touch operation on the adjustment interface to accordingly adjust the focused image and thereby obtains a new focused image (Step S710). Next, the detecting module 120 confirms whether to capture the new focused image (Step S712). If yes, the image capturing module 130 would capture and save the new focused image in the storage unit 20 (Step S714). If not, return to Step S710, and the image adjusting module 150 would continue adjusting the focused image according to the second touch operation to re-generate another new focused image. On the other hand, when the detecting module 120 detects that the first touch operation leaves the touch screen and the time determining module 140 determines that the staying time does not exceed the time threshold, the image capturing module 130 would capture and save the focused image in the storage unit 20 (Step S716). Detailed descriptions for each step may refer to the aforementioned related paragraphs and will not be repeated herein.

In the auto-focus compensation method proposed in the previous embodiments, touch behaviours of the user on the touch screen 10 are detected to enter the adjustment interface. In another embodiment, the image capturing device 100 may additionally provide a setting option associated with the adjustment interface to allow the user to set whether to automatically display the adjustment interface. Such process may be illustrated by a flowchart of an auto-focus compensation method of an image capturing device in FIG. 8 according to an embodiment of the invention.

Figure 8:
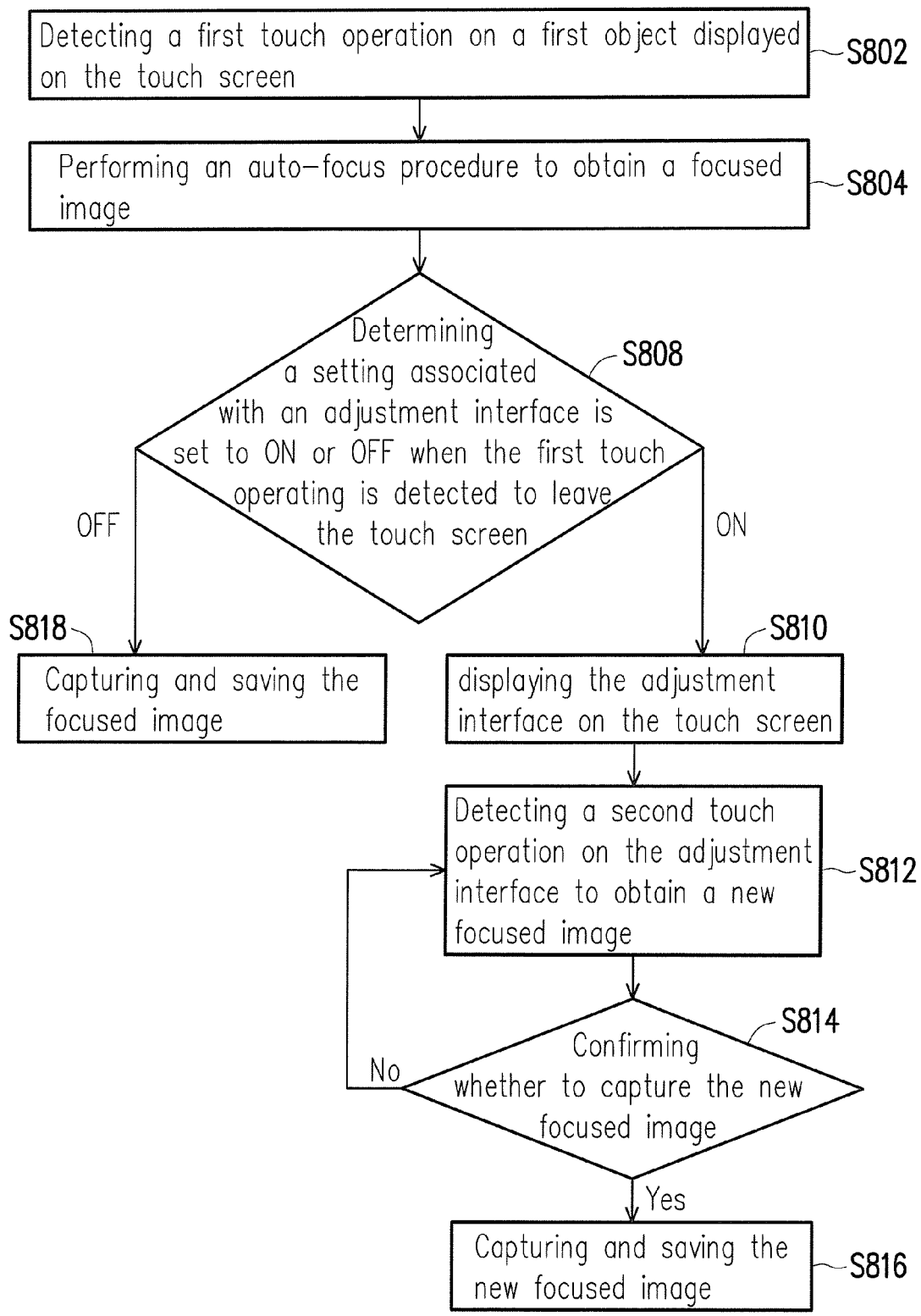
FIG. 8 illustrates a flowchart of an auto-focus compensation method of an image capturing device according to an embodiment of the invention.

Referring to FIG. 8, the detecting module 120 first detects a first touch operation on a first object displayed on the touch screen 10 (Step S802). Next, the image capturing module 130 performs an auto-focus procedure to obtain a focused image (Step S804). Descriptions for Step S802 and Step S804 may refer to the related descriptions of Step S202 and S204 and will not be repeated herein.

Next, when the detecting module 120 detects the first touch operation leaves the touch screen 10, a setting determining module (not shown) determines whether a setting associated with the adjustment interface is set to ON or OFF (Step S808). To be specific, when the detecting module 120 detects that the first touch operation of the user leaves the touch screen 10, the setting determining module would determine whether the adjustment interface is set as automatically to be turned on or forced to be turned off.

When the setting determining module determines that the setting is set to ON, the displaying module 110 would display the adjustment interface on the touch screen 10 (Step S810), and the image adjusting module 150 would adjust the focused image according to a second touch operation to obtain a new focused image (Step S812). Next, the detecting module 120 confirms whether to capture the new focused image (Step S814). If yes, the image capturing module 130 would capture and save the new focused image in the storage unit 20 (Step S816). If not, return to Step S812, and the image adjusting module 150 would re-adjust the focused image according to the second touch operation to re-generate another new focused image. On the other hand, when the setting determining module determines that the setting is OFF, the image capturing module 130 would capture and save the focused image in the storage unit 20 (Step S818). Detailed descriptions for Step S810 to Step 818 may refer to the related paragraphs of the aforementioned embodiments and will not be repeated herein.

In another embodiment, the image capturing device 100 may determine whether to adjust a focused image originally generated from the auto-focus procedure according to the clarity of the focused image. Such process may be illustrated by a flowchart of an auto-focus compensation method of an image capturing device in FIG. 9 according to an embodiment of the invention.

Figure 9:
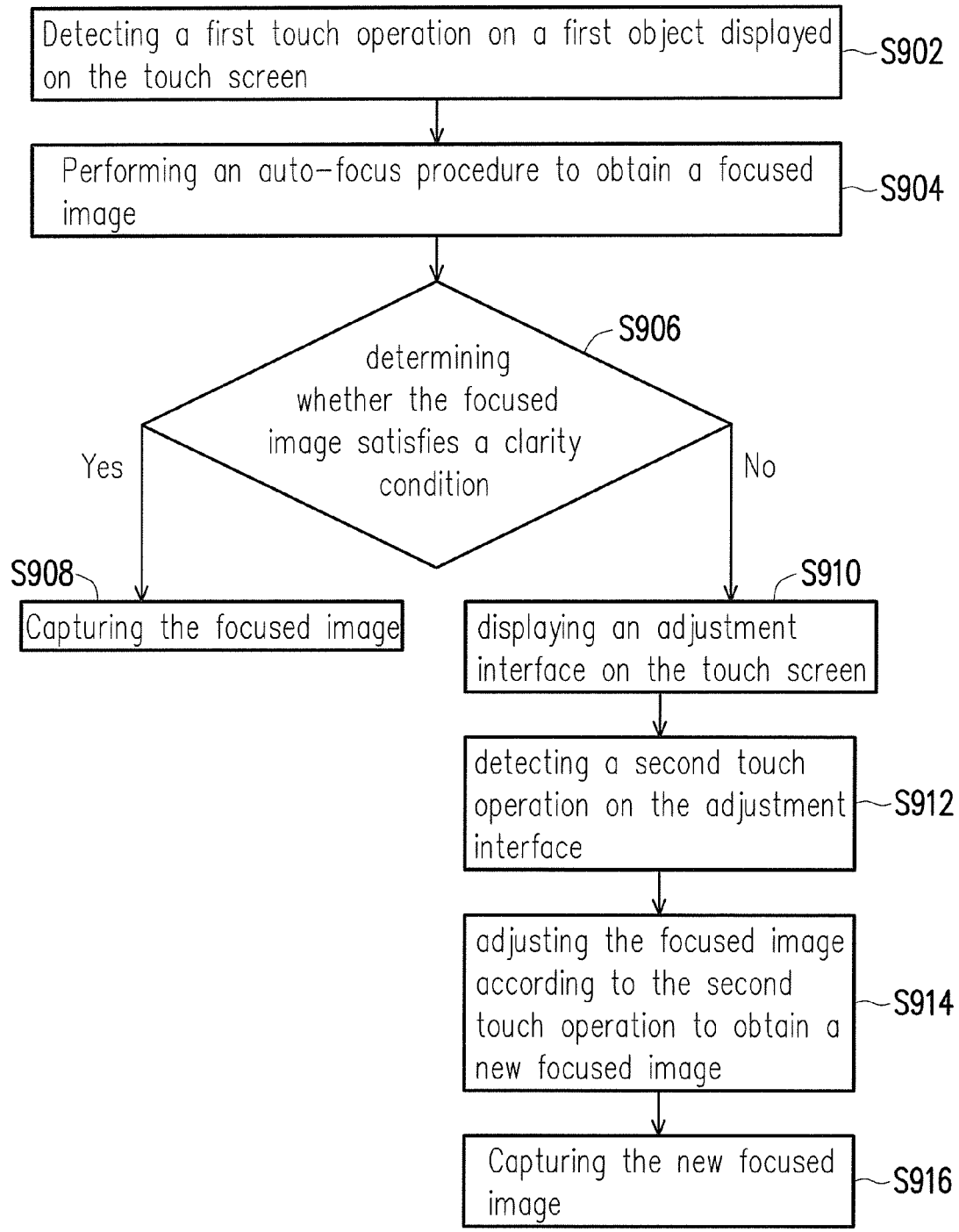
FIG. 9 illustrates a flowchart of an auto-focus compensation method of an image capturing device according to an embodiment of the invention.

Referring to FIG. 9, the detecting module 120 first detects a first touch operation detects a first touch operation on a first object displayed on the touch screen 10 (Step S902). Next, the image capturing module 130 performs an auto-focus procedure to obtain a focused image (Step S904). Descriptions for Step S902 and Step S904 may refer to the related descriptions of Step S202 and S204 and will not be repeated herein.

In the present embodiment, the image capturing device 100 further includes a focused-image determining module (not shown). After the image capturing module 130 obtains the focused image, the focused-image determining module would determine whether such focused image satisfies a clarity condition (Step S906). In the present embodiment, the clarity condition may be a clarity value of the focused image calculated based on its sharpness or contrast. However, the invention is not limited herein.

When the focused-image determining module determines that the focused image satisfies the clarity condition, the image capturing module 130 would capture the focused image (Step S908). In the present embodiment, when the focused-image determining module determines that the clarity value is greater than a predetermined clarity value, the image capturing module 130 would capture and save the focused image in the storage unit 20.

When the focused-image determining module determines that the focused image does not satisfy the clarity condition, the displaying module 110 would display an adjustment interface on the touch screen 10 (Step S910), and the detecting module 120 would detect a second touch operation on the adjustment interface (Step S912). The image adjusting module 150 would then adjust the focused image according to the second touch operation to obtain a new focused image (Step S912), and the image capturing module 130 would capture the new focused image (Step S916). Descriptions for Step S910 to Step S916 may refer to the related aforementioned descriptions and will not be repeated herein.

In summary, in the image capturing device and the auto-focus compensation method thereof, after a focused image is obtained from an auto-focus procedure, an auxiliary control mechanism of an adjustment interface is employed for allowing the user to adjust the focused image for compensating the result obtained from the auto-focus procedure so as to reduce the chances of capturing blurred or out-of-focus images.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An auto-focus compensation method, adapted to an image capturing device having a touch screen, comprising:
    detecting a first touch operation on a first object displayed on the touch screen;
    performing an auto-focus procedure to obtain a focused image;
    accumulating a staying time of the first touch operation on the first object and determining whether the staying time exceeds a time threshold;
    when the first touch operation is detected to leave the touch screen and the staying time does not exceed the time threshold, capturing the focused image; and
    when the staying time exceeds the time threshold, determining a setting associated with the adjustment interface is set to ON or OFF, wherein
        when the setting is set to ON, displaying an adjustment interface on the touch screen and detecting a second touch operation on the adjustment interface to accordingly adjust the focused image, and thereby obtaining and capturing a new focused image, and
        when the setting is set to OFF, capturing the focused image.

2. The method according to claim 1, wherein the step of detecting the second touch operation on the adjustment interface to accordingly adjust the focused image, and thereby obtaining the new focused image comprises:
    detecting a moving direction and a moving amount of the second touch operation and adjusting a first parameter associated with the image capturing device; and
    adjusting the focused image according to the adjusted first parameter and thereby obtaining the new focused image.

3. The method according to claim 1, wherein the step of detecting the second touch operation on the adjustment interface to accordingly adjust the focused image and thereby obtaining the new focused image comprises:
    detecting a moving direction and a moving amount of the second touch operation;
    when the moving direction corresponds to a horizontal direction, adjusting a second parameter associated with the image capturing device according to the moving amount;

when the moving direction corresponds to a vertical direction, adjusting a third parameter associated with the image capturing device according to the moving amount; and adjusting the focused image according to the adjusted second parameter and the adjusted third parameter and thereby obtaining the new focused image.

4. The method according to claim 1, wherein the step of detecting the second touch operation on the adjustment interface to accordingly adjust the focused image and thereby obtaining the new focused image comprises:

displaying a plurality of parameters associated with the image capturing device on the adjustment interface;

detecting a third touch operation on the parameters;

detecting a moving direction and a moving amount of the second touch operation and adjusting a selected parameter accordingly, wherein the selected parameter is selected from the parameters by the third touch operation; and adjusting the focused image according to the adjusted selected parameter and thereby obtaining the new focused image.

5. The method according to claim 1, wherein after the step of detecting the second touch operation on the adjustment interface to accordingly adjust the focused image and thereby obtaining the new focused image, the method further comprises:

displaying the focused image and the new focused image on the adjustment interface concurrently.

6. An image capturing device, comprising:

a touch screen;

a storage unit, recording a plurality of modules; and one or more processing unit, coupled to the touch screen and the storage unit, accessing and executing the modules recorded in the storage unit, wherein the modules comprise:

a displaying module, displaying a first object on the touch screen;

a detecting module, detecting a first touch operation on the first object;

an image capturing module, performing an auto-focus procedure to obtain a focused image;

a time determining module, accumulating a staying time of the first touch operating on the first object and determining whether the staying time exceeds a time threshold;

a setting determining module; and an image adjusting module, wherein when the detecting module detects that the first touch operation leaves the touch screen and the time determining module determines that the staying time does not exceed the time threshold, the image capturing module captures the focused image, wherein when the time determining module determines that the staying time exceeds the time threshold, the setting determining module determines a setting associated with the adjustment interface is set to ON or OFF, wherein when the setting determining module determines that the setting is set to ON, the displaying module displays an adjustment interface on the touch screen, the detecting module detects a second touch operation on the adjustment interface, the image adjusting module adjusts the focused image according to the second touch operation on the adjustment interface and thereby obtains a new focused image, and the image capturing module captures the new focused image;

wherein when the setting determining module determines that the setting is set to OFF, the image capturing module captures the focused image.

7. An auto-focus compensation method, adapted to an image capturing device having a touch screen, comprising:

detecting a first touch operation on a first object displayed on the touch screen;

performing an auto-focus procedure to obtain a focused image;

determining whether the focused image satisfies a clarity condition;

when the focused image satisfies the clarity condition, capturing the focused image; and when the focused image does not satisfy the clarity condition, determining a setting associated with the adjustment interface is set to ON or OFF, wherein when the setting is set to ON, displaying an adjustment interface on the touch screen and detecting a second touch operation on the adjustment interface to accordingly adjust the focused image, and thereby obtaining and capturing a new focused image, when the setting is set to OFF, capturing the focused image.

* * * * *